Patented Apr. 18, 1950

2,504,099

UNITED STATES PATENT OFFICE 2,504,099

CYCLOHEXYL ETHERS OF CYCLIC SULFONES

Rupert C. Morris, Berkeley, and John L. Van Winkle, San Lorenzo, Calif., assignors to Shell Development Company, San Francisco, Calif., a corporation of Delaware No Drawing. Application October 22, 1945,
Serial No. 623,864

8 Claims. (Cl. 260—329)

This invention relates to a novel and particularly useful class of sulfolanyl ethers and to the method of their production. More particularly, the invention pertains to a novel class of ethers of cyclic sulfones comprising poly-alkyl cyclohexyl sulfolanyl ethers and to the method of their production.

The novel compounds of the present invention are distinguishable from ethers of cyclic sulfones known heretofore by the presence of a poly-alkyl cyclohexyl radical connected by an ether oxygen atom to a sulfolanyl radical. It has been found that the cyclic sulfones of the invention possess unexpected and highly useful properties believed attributable to the presence of the poly-alkyl substituted cyclohexyl radical, which not only render these compounds applicable with results which are markedly superior to those obtainable with the aid of sulfolanyl ethers available heretofore, but which, furthermore, enable their utilization in fields of application where the use of heretofore available sulfolanyl ethers is either unsatisfactory or even entirely ineffective. For example, certain properties possessed to a peculiar degree by the compounds of the invention render them of particular value in the production of synthetic rubbers, resins and other highly polymeric materials. Their effectiveness as plasticizers, softening agents, modifying agents for such polymeric materials make them valuable additives to these materials during the production, processing or treatment thereof. The compounds of the invention are of particular value as plasticizers for cellulose acetate resins and polyvinyl chloride polymers. They are effective as insecticidal toxicants and as such are valuable components of insecticidal compositions. Their usefulness in the production of insecticides is further enhanced by their pronounced effect as solubilizing agents for such materials as derris root and rotenone. The compounds of the invention are furthermore of value as solvents, as starting or intermediate materials in the production of chemical derivatives, pharmaceuticals, dye intermediates, etc.

The novel compounds of the invention comprise broadly the sulfolanyl ethers wherein a poly-alkyl cyclohexyl group and a cyclic sulfone group having a five-membered ring consisting of four carbon atoms and one sulfonyl radical, are attached to an oxygen atom.

The cyclic sulfones, to novel ethers of which the present invention is directed, comprise those wherein the nuclear carbon atoms are saturated as well as those wherein at least two of the nuclear carbon atoms are connected by means of an olefinic double bond. These saturated sulfones are referred to hereinafter as sulfolanes. By the term "a sulfolane" as employed in the specification and claims is meant a structure containing four carbon atoms and a sulfur atom in a ring, the sulfur atom of this five membered heterocyclic ring having two oxygen atoms attached thereto. The structural formula of the simple unsubstituted sulfolane is:

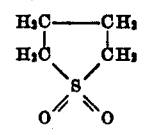

This compound has also been termed "thiacyclopentane - 1,1 - dioxide," "thiolane - 1,1 - dioxide," "cyclotetramethylene sulfone" or "dihydrobutadiene sulfone."

The cyclic sulfones containing unsaturated carbon atoms in the ring are referred to hereinafter as "sulfolenes." By the term "a sulfolene" is meant a structure containing four carbon atoms and a sulfur atom in a ring, the sulfur atom having two oxygen atoms attached thereto, and two vicinal nuclear carbon atoms being joined together by an olefinic linkage. This compound has also been called "thiacyclopentane-1,1-dioxide." The single double bond in the sulfolene ring may be between any two adjacent carbon atoms. The structural formula of the single unsubstituted 3-sulfolene is represented by the formula

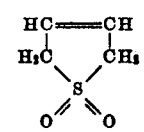

similarly the structure of the simple unsubstituted 2-sulfolene is represented by the formula

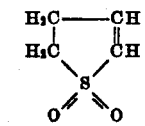

The generic terms "a sulfolane" and "a sulfolene" as employed herein furthermore comprise not only the compounds described above but also the substituted products thereof wherein one or more of the hydrogen atoms are substituted by an organic radical, preferably a substituted or unsubstituted hydrocarbon radical such as an alkyl, alkenyl, cyclo-alkyl, cyclo-alkenyl, aryl, aralkyl or aralkenyl group. The substituent groups directly connected to the nuclear carbon atoms of sulfolane, or sulfolene, may be further substituted, for example, by the replacement therein of a hydrogen atom by one or more halogen atoms such as chlorine, bromine, and fluorine.

Similarly "a sulfolanyl radical" is the monovalent radical resulting from the removal of a hydrogen atom from a nuclear carbon atom of "a sulfolane," and "a sulfolenyl radical" is the monovalent radical resulting from the removal of a hydrogen atom from a nuclear carbon atom of "a sulfolene."

The novel sulfolanyl ethers of the invention are represented by the following general structural formula

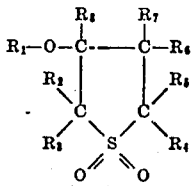

wherein $R_1$ represents a poly-alkyl cyclohexyl radical and the symbols $R_2$, $R_3$, $R_4$, $R_5$, $R_6$, $R_7$ and $R_8$ of the sulfolanyl radical represent the same or different atoms or groups such as hydrogen atoms, halogen atoms or organic radicals which are preferably substituted or unsubstituted hydrocarbon radicals, such as alkyl, alkenyl, cyclo-alkyl, cyclo-alkenyl, aryl, aralkyl or aralkenyl groups, or a hydroxyl group, an alkoxy group, e. g. the methoxy radical, the nitrile group, an amino group, an alkylamino group, an ester group; a halogen such as a chlorine, bromine or fluorine atom, etc.

The poly-alkyl substituted cyclohexyl ring, $R_1$, of the above formula consists of a saturated six-membered carbocyclic ring in which at least two, and preferably three, of the nuclear carbon atoms are each directly attached to an alkyl group, such as, for example, methyl, ethyl, propyl, normal butyl, isobutyl, normal amyl, isoamyl, normal hexyl, isohexyl, normal heptyl, isoheptyl, normal octyl, isooctyl, etc. Two of the alkyl substituents, which may be alike or different, may be attached to a single nuclear carbon atom of the cyclohexyl group. The substituent groups attached to the nuclear carbon atoms of the cyclohexyl groups may be further substituted, for example, by the replacement therein of one or more hydrogen atoms thereof by halogen, such as chloride, bromine and fluorine.

The compounds of the invention comprise those wherein the polyalkyl cyclohexyl radical, $R_1$, contains at least eight carbon atoms and preferably not more than eighteen carbon atoms. It is, however, intended that the sulfolanyl ethers within the prescribed class comprising a polyalkyl cyclohexyl ring containing more than eighteen carbon atoms are comprised within the scope of the invention.

Preferred compounds of the invention comprise those wherein the ether oxygen atom is directly attached to a nuclear carbon atom of the poly-alkyl substituted cyclohexyl ring of the radical, $R_1$, or to a carbon atom which is in turn directly attached to a nuclear carbon atom of the poly-alkyl cyclohexyl group of radical $R_1$. This preferred class of compounds comprises, for example, 3,5-dimethylcyclohexyl 3-sulfolanyl ether
4,4-dimethylcyclohexyl 3-sulfolanyl ether
2,2-dimethylcyclohexyl 3-sulfolanyl ether
3,3,5-trimethylcyclohexyl 3-sulfolanyl ether
2,3,4-trimethylcyclohexyl 3-sulfolanyl ether
2,4,6-trimethylcyclohexyl 3-sulfolanyl ether
4,4,6-trimethylcyclohexyl 3-sulfolanyl ether
3,4,5-trimethylcyclohexyl 3-sulfolanyl ether
2,3,4,5-tetramethylcyclohexyl 3-sulfolanyl ether
3-methyl-5-ethyl-cyclohexyl 3-sulfolanyl ether
3,3 - dimethyl - 5 - ethyl - cyclohexyl 3 - sulfolanyl ether
5 - methyl-3,3-diethyl-cyclohexyl 3 - sulfolanyl ether
2,2-diethylcyclohexyl 3-sulfolanyl ether
3,3,5-triethylcyclohexyl 3-sulfolanyl ether
2,4,5-triethylcyclohexyl 3-sulfolanyl ether
2-methyl-4-butylcyclohexyl 3-sulfolanyl ether
3,3-dimethyl-5-butylcyclohexyl 3-sulfolanyl ether
3,3-diethyl-5-butylcyclohexyl 3-sulfolanyl ether
2-ethyl-4-butylcyclohexyl 3-sulfolanyl ether
3,3-dibutylcyclohexyl 3-sulfolanyl ether
3,3,5-tributylcyclohexyl 3-sulfolanyl ether
3,3-diethyl-5-pentylcyclohexyl 3-sulfolanyl ether
2,4-dipentylcyclohexyl 3-sulfolanyl ether
3,3-dibutyl-5-pentylcyclohexyl 3-sulfolanyl ether
3,3-dimethyl-5-hexylcyclohexyl 3-sulfolanyl ether
3,3 - dimethyl - 5- heptylcyclohexyl 3 - sulfolanyl ether
3,3-dimethyl-5-octylcyclohexyl 3-sulfolanyl ether
3,5-dimethylcyclohexylcarbinyl 3-sulfolanyl ether
3,4-dimethylcyclohexylcarbinyl 3-sulfolanyl ether
4,4-dimethylcyclohexylcarbinyl 3-sulfolanyl ether
3,3,5 - trimethylcyclohexylcarbinyl 3 - sulfolanyl ether
2,4,6 - trimethylcyclohexylcarbinyl 3 - sulfolanyl ether
2,3,4,5 - tetramethylcyclohexylcarbinyl 3 - sulfolanyl ether
2,2-diethylcyclohexylcarbinyl 3-sulfolanyl ether
2,4,6-triethylcyclohexylcarbinyl 3-sulfolanyl ether
3,3 - diethyl - 5 - butylcyclohexylcarbinyl 3 - sulfolanyl ether
3,3 - dimethyl - 5 - hexylcyclohexylcarbinyl 3 - sulfolanyl ether
5,5 - dimethyl - 3 - octylcyclohexylcarbinyl 3 - sulfolanyl ether The novel compounds of the invention are obtained by the reaction of a sulfolene of the above-defined class with an alicyclic alcohol comprising a poly-alkyl cyclohexyl group under the conditions set forth fully hereinafter.

Of the suitable alicyclic alcohols, those containing no more than eighteen carbon atoms are preferred. Thus, ethers comprised in the above-named class of preferred compounds are obtained by reacting a sulfolene, for example 3-sulfolene, with an alicyclic alcohol comprising a poly-alkyl cyclohexyl group corresponding to the poly-alkyl cyclohexyl group of the desired sulfolanyl ether. Examples of suitable alicyclic alcohols which upon reaction with the sulfolenes yield sulfolanyl ethers of the above-defined preferred class comprise the poly-alkyl cyclohexanols and the poly-alkyl cyclohexylcarbinols, such as, 3,5-dimethylcyclohexanol
4,4-dimethylcyclohexanol
2,2-dimethylcyclohexanol
3,3,5-trimethylcyclohexanol
2,3,4-trimethylcyclohexanol
4,4,6-trimethylcyclohexanol
3,4,5-trimethylcyclohexanol
2,3,4,5-tetramethylcyclohexanol
5-methyl-3,3-diethylcyclohexanol
2,4,5-triethylcyclohexanol
3,3-diethyl-5-butylcyclohexanol
2,4-dipentylcyclohexanol
3,3-dimethyl-5-octylcyclohexanol
3,5-dimethylcyclohexylcarbinol
3,3,5-trimethylcyclohexylcarbinol
3,3-diethyl-5-butylcyclohexylcarbinol
5,5-dimethyl-3-octylcyclohexylcarbinol
1,2,4-trimethylcyclohexyl carbinol
1,3,5-trimethylcyclohexyl carbinol
2,4,6-trimethylcyclohexyl carbinol
2,3,5-trimethylcyclohexyl carbinol
1,2,4-trimethyl-6-ethylcyclohexyl carbinol
1,3,5-trimethyl-6-ethylcyclohexyl carbinol
2,4-dimethyl-1-ethyl-6-propylcyclohexyl carbinol
3,5-dimethyl-1-ethyl-6-propylcyclohexyl carbinol
2,4-dimethyl-1-neopentylcyclohexyl carbinol
3,5-dimethyl-1-neopentylcyclohexyl carbinol It is to be understood, however, that the process of the invention is in no wise limited to the preferred sulfolanyl ethers of the above class wherein the ether oxygen atom is directly connected to a nuclear atom of the poly-alkyl cyclohexyl group or to a carbon in turn directly attached to a nuclear carbon atom of the poly-alkyl cyclohexyl group. Thus the novel compounds of the invention comprise, for example, compounds wherein the ether oxygen atom is removed by more than one carbon atom, but preferably by not more than four carbon atoms, from the nucleus of the poly-alkyl cyclohexyl group, but in which the total number of carbon atoms of the entire poly-alkyl cyclohexenyl group attached to the ether oxygen does nevertheless preferably not exceed eighteen carbon atoms. Such compounds comprise, for example, 2-(2,4,6-trimethyl cyclohexyl)-ethyl 3-sulfolanyl ether
2-(4,4-dimethyl cyclohexyl)-ethyl 3-sulfolanyl ether
2-(3,3,5-trimethyl cyclohexyl)-ethyl 3-sulfolanyl ether
2-(5-methyl-3,3-diethyl cyclohexyl)-ethyl 3-sulfolanyl ether
2-(3,3-dimethyl-5-octyl cyclohexyl)-ethyl 3-sulfolanyl ether
2-(2,4,6-trimethyl cyclohexyl)-2-methyl-ethyl 3-sulfonanyl ether
3-(3,3,5-trimethyl cyclohexyl)-propyl 3-sulfolanyl ether
3-(2,3,4,5-tetramethyl cyclohexyl)-propyl 3-sulfolanyl ether
3-(2,4,5-triethyl cyclohexyl)-propyl 3-sulfolanyl ether.

These compounds are likewise obtainable by reacting an alicyclic alcohol containing a poly-alkyl cyclohexyl group corresponding to the poly-alkyl cyclohexyl group of the desired sulfolanyl ether, with a sulfolene, for example 3-sulfolene. Such alcohols are exemplified by 2-(2,4,6-trimethyl cyclohexyl)-ethanol-1
2-(4,4-dimethyl cyclohexyl)-ethanol-1
2-(3,3,5-trimethyl cyclohexyl)-ethanol-1
2-(2,4,6-trimethyl cyclohexyl)-2-methyl-ethanol-1
3-(3,3,5-trimethyl cyclohexyl)-propanol-1
3-(2,4,5-triethyl cyclohexyl)-propanol-1

Illustrative examples of the novel compounds of the invention above set forth have stressed the poly-alkyl cyclohexyl 3-sulfolanyl ethers. It is again to be stressed, however, that the invention is in no wise limited to only the 3-sulfolanyl ethers and comprises broadly the novel poly-alkyl cyclohexyl ethers of the class of cyclic sulfones defined above. Illustrative of the unsaturated cyclic sulfones which are reacted with the above-defined alicyclic alcohols containing a poly-alkyl cyclohexyl group, under conditions resulting in the production of the novel sulfolanyl ethers of the invention, comprise the following:

-sulfolene
2-methylsulfolene
2,5-dimethylsulfolene
3-methylsulfolene
2,4-dimethylsulfolene
3,4-dimethylsulfolene
4-methylsulfolene
3-methylsulfolene
3-ethylsulfolene
2-hydroxysulfolene
2-methoxysulfolene
5-methylsulfolene
2-ethylsulfolene
2-methyl-3-ethylsulfolene
2-methyl-3-proplysulfolene
2-vinyl-3-sulfolene
3-allyl-sulfolene
2-vinyl-2-sulfolene
3-methyl-4-chloro-3-sulfolene
2-chloro-3-methyl-3-sulfolene
3-tertiarybutyl-3-sulfolene
3-phenyl-3-sulfolene
3,4-diphenyl-3-sulfolene and their suitable substitution products. The sulfolenes and their suitable substitution products, as pointed out above, comprise the 2-sulfolenes and the 3-sulfolenes.

In the preparation of the novel sulfolanyl ethers by the reaction of a sulfolene with an alicyclic alcohol of the defined class, it is preferred to use a 3-sulfolene as a starting material. Production of the novel sulfolanyl ethers by the reaction of a sulfolene with an alicyclic alcohol is represented by the following equation illustrating the preparation of 2,4,6-trimethylcyclohexylcarbinyl 3-sulfolanyl ether from 2,4,6-trimethylcyclohexylcarbinol and 3-sulfolene:

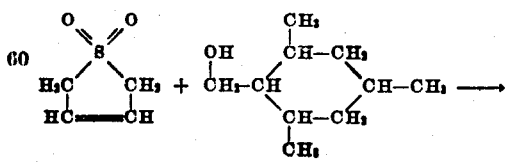

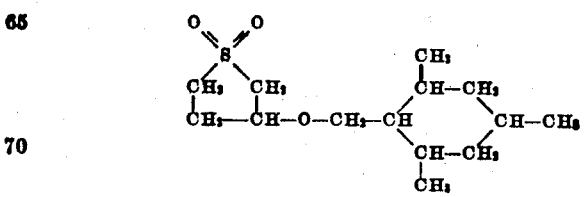

The reaction of the sulfolene with an alicyclic alcohol of the defined class is preferably executed in the presence of a small amount of an alkaline substance. The utilization of such an alkaline reaction medium enables the attainment of the desired novel sulfolanyl ethers with excellent yields free of any substantial amounts of undesirable side reaction products. Suitable alkaline substances comprise in general the more basic compounds of the alkali metals as well as certain of the strong organic bases. Suitable basic compounds include trimethylbenzyl ammonium hydroxide, sodium hydroxide, potassium hydroxide, sodium carbonate, potassium carbonate, lithium hydroxide, and the like. Preferred members of this group are potassium hydroxide and sodium hydroxide. The alkaline agents may be used in amounts which may vary widely within the scope of the invention. In general, an amount between about 0.1% to about 3.0%, preferably about 1.0%, based upon the weight of the cyclic sulfone employed, have been found satisfactory. They may be used as such or in the form of an aqueous solution, preferably in solutions containing from about 0.1% to about 40% by weight of basic alkali metal compound. Additional amounts of the alkaline agents may be added during the course of the reaction to maintain the alkalinity of the reaction mixture.

It is preferred to execute the reaction in the presence of a substantial excess of the alicyclic alcohol. The alicyclic alcohol in the reaction mixture may suitably range from about two to about four mols, and even more, per mol of sulfolene present. Inert materials such as, for example, dioxane, ethylene glycol diethyl ether, benzene, capable of functioning as diluent materials, or heat controlling media, may be added to the reactants.

The temperature of execution of the reaction will vary, depending upon the particular reactants employed. In general, the maximum permissible temperature will be defined by the decomposition temperature of the sulfolene employed. In the case of 3-sulfolene this in in the range of about 120° C. The lower limit will generally depend to a substantial degree upon the temperature required to initiate the reaction. This temperature generally ranges from about normal room temperature or somewhat lower, for example 15° to 20° C., to about 40° C. A preferred operating temperature range comprises a temperature in the range of for example from about room temperature to about 80° C.

The reaction is executed advantageously at atmospheric pressure. Superatmospheric pressures up to for example about 500 pounds, and even higher, may however be resorted to.

Upon completion of the reaction the sulfolanyl ether is separated from the reaction mixture, which will generally include unreacted alicyclic alcohol preferably added in excess to the charge, by any suitable means comprising such steps as, for example, distillation, washing, solvent extraction, filtration, and the like.

The reaction is executed in any suitable type of apparatus enabling intimate contact of the reactants and control of operating conditions. The process may be carried out in batch, semi-continuous or continuous operation. When continuous operation is resorted to, reactants continuously withdrawn from the reaction zone are preferably subjected to a substantially continuous product separating operation under conditions enabling the continuous recycling to the reaction zone of separated unreacted materials.

The following examples are illustrative of the invention:

*Example I*

3,3,5-trimethylcyclohexyl 3-sulfolanyl ether was prepared by dissolving 6 grams of sodium hydroxide in 1040 grams of 3,3,5-trimethylcyclohexyl on a water bath. To the resulting solution there was slowly added 378 grams of 3-sulfolene while maintaining the temperature of the mixture at 65° C. After addition of the 3-sulfolene the reactants were maintained at a temperature of 50° C. to 70° C. for a period of 48 hours. The reaction products were neutralized by the addition of HCl and unconverted cyclic alcohol distilled therefrom at reduced pressure. A conversion of 53.13% was obtained (based upon conversion of 3-sulfolene to 3,3,5-trimethyl cyclohexyl 3-sulfolanyl ether). Since the 3,3,5-trimethyl cyclohexane-1-ol employed consisted of equal parts of the cis and trans isomers thereof, the 3,3,5-trimethyl cyclohexyl 3-sulfolanyl ether obtained which has the probable structural formula:

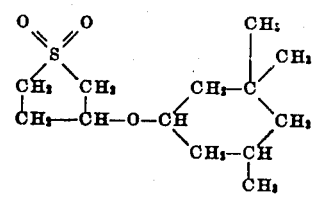

consisted of equal parts of the cis and trans isomers of the ether, one of which was a crystalline solid and other a normally liquid product. The normally liquid product distilled at 170° to 180° C. at a pressure of 4 mm. The normally solid product melts over the following range: 86.9 to 98.7° C. The ethers thus obtained were soluble in kerosene.

*Example II*

2,4,6-trimethylcyclohexylcarbinyl 3-sulfolanyl ether was prepared by slowly adding to a solution of 0.1 mol of potassium hydroxide in 3 mols of 2,4,6-trimethylcyclohexylcarbinol, 1 mol of 3-sulfolene. The reaction mixture was maintained at a temperature of 60° C. for a period of 48 hours, after which unreacted cyclic alcohol was distilled therefrom at reduced pressure. The 2,4,6-trimethylcyclohexylcarbinyl 3-sulfolanyl ether of the probable structural formula:

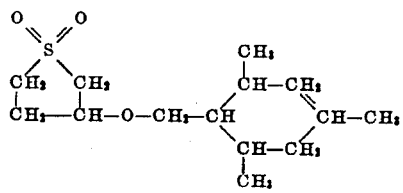

was recovered in 60.2% yield based on 3-sulfolene charged, and 73.6% yield upon the trimethylcyclohexylcarbinol charged. The ether distilled at 167–168° C. at 1 mm. pressure has a specific gravity of $d_4^{20}$ 1.0985 and a refractive index of $n_D^{20}$ 1.4969. The product analyzed for 12.21% sulfur (theoretical 11.75%). The ether is easily soluble in mineral oil and insoluble in water.

The ether was found to be water stable, compatible with polyvinyl chloride, and proved to be an excellent plasticizer for this polymeric product.

*Example III*

To a solution of 52.7 grams of potassium hydroxide in 2945 grams of 2,4,6-trimethylcyclohexylcarbinol there was slowly added 1114 grams of 3-sulfolene. The resulting mixture was maintained at a temperature of 40° C. for a period of 48 hours. 2446 grams of 2,4,6-trimethylcyclohexylcarbinyl 3-sulfolanyl ether were recovered. This represents a 47.3% conversion on the cyclic alcohol, and a yield of 94.6% on the 3-sulfolene and 96.5% on the cyclic alcohol. The ether was slightly yellow in color but was readily decolorized by treatment with charcoal. The properties of the product obtained were those of the product obtained in Example II.

Example IV 3,3,5-trimethylcyclohexyl (2,5-dimethyl)-3-sulfolanyl ether is prepared by dissolving 7.5 grams of sodium hydroxide in 715 grams of 3,3,5-trimethylcyclohexane-1-ol on a steam bath. To the resulting alkaline solution there is slowly added 148 grams of 2,5-dimethyl-3-sulfolene. The mixture is stirred on the steam bath at a temperature of from about 50 to about 70° C. for a period of 48 hours. The reaction mixture is washed, filtered and the unreacted cyclic alcohol distilled therefrom at reduced pressure to recover the 3,3,5-trimethylcyclohexyl (2-5-dimethyl)-3-sulfolanyl ether.

Example V 2,4,6-trimethylcyclohexylcarbinyl (3-methyl)-3-sulfolanyl ether is prepared by dissolving 1.6 grams of potassium hydroxide in 640 grams of 2,4,6-trimethylcyclohexylcarbinol on a steam bath. To the resulting solution there is slowly added 134 grams of 3-methyl-2-sulfolene. The reaction mixture is maintained at a temperature in the range of from 45° C. to 60° C. for a period of about 24 hours. When the reaction is completed the reaction mixture is washed and distilled at reduced pressure to effect the removal of unreacted cyclic alcohol from the 2,4,6-trimethylcyclohexylcarbinyl (3-methyl)-3-sulfolanyl ether.

Example VI 2,3-diethylcyclohexyl (3-methyl-4-methoxy)-3-sulfolanyl ether is prepared by dissolving 1.7 grams of sodium hydroxide in 650 grams of 2,3-diethylcyclohexane-1-ol on a steam bath. To the resulting alkaline solution there is slowly added 170 grams of 3-methyl-4-methoxy-sulfolene. The reaction mixture is maintained at a temperature of from 50° C. to 75° C. for a period of about 48 hours. When the reaction is complete the reaction mixture is washed and distilled at reduced pressure to remove unreacted cyclic alicyclic alcohol from the 2,3-diethylcyclohexyl (3-methyl-4-methoxy)-3-sulfolanyl ether.

Example VII 2,4,6-trimethylcyclohexylcarbinyl (3-phenyl)-3-sulfolanyl ether is prepared by dissolving 2 grams of potassium hydroxide in 750 grams 2,4,6-trimethylcyclohexylcarbinol on a steam bath. To the resulting alkaline solution there is slowly added 198 grams of 3-phenyl-3-sulfolene. The reaction mixture is maintained at a temperature of from 60° to 80° C. for a period of 24 hours. Thereupon the reaction mixture is washed and distilled under reduced pressure to separate unreacted cyclic alcohol from the 2,4,6-trimethylcyclohexylcarbinyl (3-phenyl)-3-sulfolanyl ether.

Example VIII 2,4,6-trimethylcyclohexylcarbinyl (2-4-ditertiary butyl)-4-sulfolanyl ether is prepared by adding 2.7 grams of potassium hydroxide to 960 grams of 2,4,6-trimethylcyclohexylcarbinol on a steam bath. To the resulting solution there is slowly added 240 grams of 2,4-tertiary butyl-3-sulfolene. The reaction mixture is maintained at a temperature of from 60° C. to about 80° C. for a period of 28 hours whereupon it is washed and distilled under reduced pressure to remove unreacted cyclic alcohol from the 2,4,6-trimethylcyclohexylcarbinyl (2,4-ditertiary butyl)-4-sulfolanyl ether.

Among the novel compounds of the present invention possessing outstanding characteristics rendering them of value in a multiplicity of applications, particularly as plasticizing agents for highly polymeric materials, are the novel sulfolanyl ethers containing a poly-alkyl cyclohexyl group containing from twelve to eighteen carbon atoms to the molecule. A particularly suitable source of the alicyclic alcohols containing the necessary poly-alkyl cyclohexyl group of from twelve to eighteen carbon atoms to the molecule are the cyclic reaction products produced in many of the chemical processes involving condensation, and polymerization reactions, and the like. Thus, in the condensation of ketones, for example acetone, in the presence of alkaline agents under conditions resulting in the production of, for example, isophorone as the major product, there are invariably produced higher boiling oxygen-containing polymeric compounds containing a poly-alkyl cyclohexyl group of from twelve to eighteen or more carbon atoms to the molecule. Upon hydrogenation of these oxygen-containing poly-alkyl cyclohexyl compounds there are obtained the corresponding alicyclic alcohols containing a poly-alkyl cyclohexyl group of from twelve to eighteen carbon atoms to the molecule. These alcohols are particularly suitable for reaction with the sulfolenes above defined to obtain novel higher boiling sulfolanyl ethers comprised within the scope of the invention.

The invention is not limited to the reaction of but a single alcohol with a single one of the defined sulfolenes, and two or more of the defined alicyclic alcohols may be reacted with two or more of the sulfolenes. Thus hydrogenation of the oxygen-containing compounds, which may suitably be obtained as side reaction products in other processes as described above, to result in mixtures of alicyclic alcohols comprised within the class suitable for the production of the novel sulfolanyl ethers may be reacted as such with one or more of the sulfolenes to result in mixtures of a plurality of the novel sulfolanyl ethers. The mixed sulfolanyl ethers thus obtained from hydrogenated polymeric materials obtained as side reactions in the condensation of ketones, such as acetone, in the presence of an alkaline reagent are found to be particularly valuable as such as plasticizing agents and components in insecticidal compositions.

Example IX

An alicyclic alcohol of twelve carbon atoms to the molecule, containing a poly-alkyl cyclohexyl group, was prepared by the hydrogenation of a reaction product obtained in the condensation of mesityl oxide in the presence of an alkaline agent. The cyclic alcohol distilled in the range of from 230° C. to 240° C., had a specific gravity of $d_4^{20}$ 0.8874 and a refractive index of $n_D^{20}$ 1.4612.

10 grams of sodium hydroxide were dissolved in 2208 grams of the cyclic alcohol thus obtained on a steam bath. To the resulting solution there was slowly added with stirring 708 grams of 3-sulfolene. The reaction mixture was stirred for an additional period of 48 hours at a temperature of from 50° C. to 60° C. The resulting reaction products were washed with water. Remaining water-insoluble materials were distilled under reduced pressure from the reaction product. A heavy, viscous, oily sulfolanyl ether was recovered. The ether was miscible with kerosene, insoluble in water, and readily dissolves derris root. The ether distilled at 185 to 192° C. at 2 mm. pressure, had a specific gravity of $d_4^{20}$ 1.0593 and a refractive index of $n_D^{20}$ 1.4876.

*Example X*

An alcohol containing twelve carbon atoms to the molecule and having a poly-alkyl cyclohexyl group was prepared by hydrogenating the oxygen-containing polymeric product containing twelve carbon atoms to the molecule and having a poly-alkyl cyclohexyl group obtained as a side reaction in the condensation of acetone in the presence of alkali under conditions whereby isophorone is obtained as the principal reaction product.

85 grams of 85% aqueous potassium hydroxide were dissolved in 2982 grams of the cyclic alcohol thus obtained on a steam bath. To the resulting solution there was slowly added 472 grams of 3-sulfolene. The reaction mixture was allowed to remain at a temperature of from 50 to 60° C. for a period of 48 hours. The resulting reaction products were washed with water and the unreacted and water-insoluble materials distilled therefrom. A conversion of 73% to the sulfolanyl ether based on the 3-sulfolene was obtained. The ether distilled at a temperature of from 184° C. to 189° C. at 1.3 mm.

*Example XI*

A mixture of poly-alkyl cyclohexanols containing from twelve to fifteen carbon atoms to the molecule was prepared by hydrogenating the polymeric product comprising oxygen-containing compounds having from twelve to fifteen carbon atoms to the molecule and containing a poly-alkyl cyclohexyl group, obtained as side products in the condensation of acetone in the presence of an alkali. The mixture of cyclohexanols thus prepared had an average molecular weight of about 206.

25 grams of potassium hydroxide were dissolved in 3106 grams of the mixture of poly-alkyl cyclohexanols thus obtained on a steam bath. To the resulting alkaline solution there was slowly added 472 grams of 3-sulfolene. The reaction mixture was maintained at room temperature for a period of 48 hours. The resulting reaction products were then water washed and unreacted, water-insoluble materials distilled therefrom. A conversion of 49% of the sulfolene to sulfolanyl ethers was obtained. The ether reaction product distilled at 182 to 195° C. at 1 mm. pressure.

The mixed ethers thus obtained showed utility as an insecticide and as an excellent solubilizing agent for rotenone.

*Example XII*

A mixture of poly-alkyl cyclohexanols containing from fifteen to eighteen carbon atoms to the molecule was prepared by hydrogenating a fraction of the polymeric products comprising oxygen-containing compounds having from fifteen to eighteen carbon atoms to the molecule and containing a poly-alkyl cyclohexyl group, obtained as side products in the condensation of acetone in the presence of an alkali. This mixture of poly-alkyl cyclohexanols had an average molecular weight of 227.

*Example XIII*

25 grams of potassium hydroxide were dissolved in 3368 grams of the mixed poly-alkyl cyclohexanols thus obtained on a steam bath. To the resulting alkaline alcoholic solution there was slowly added 472 grams of 3-sulfolene. The mixture was maintained at room temperature for a period of about 48 hours. The resulting reaction mixture was washed with water and the water-insoluble unreacted materials distilled therefrom under reduced pressure. A 10% conversion to sulfolanyl ethers, based upon the sulfolene, was obtained. The mixed sulfolanyl ethers distilled at 160 to 198° C. at 2 mm. pressure. The ether product was water-insoluble, soluble in hydrocarbons. It possesses insecticidal properties and is an effective solubilizing agent for rotenone.

Characteristic of the unexpected properties of the novel sulfolanyl ethers of the invention, distinguishing them from other sulfolanyl ethers such as, for example, those containing open chain alkyl radicals of substantially the same number of carbon atoms but which are devoid of a poly-alkyl cyclohexyl group, is their behavior as plasticizers and softening agents for highly polymeric substances. Their use as plasticizers in the treatment or processing of these materials enables the attainment of markedly superior results over those obtainable when utilizing many of the available plasticizing agents. This is illustrated by the following examples evidencing superior results obtainable in the processing and compounding of such materials as cellulose acetate resin with the aid of the novel sulfolanyl ethers of the invention as plasticizing agents.

*Example XIV*

The stability of the compounds of the invention in the presence of water, and their superiority in this respect as compared to certain other representative plasticizers, is evidenced by the following:

10 grams of 2,4,6-trimethylcyclohexylcarbinyl 3-sulfolanyl ether was refluxed for twenty-four hours with 100 cc. of distilled water. The solution was then treated with a normal sodium hydroxide solution. The result obtained is indicated in the following table in cc. of normal alkali solution required per 100 grams of the refluxed ether. Also given in the table for comparative purposes are the values obtained under identical conditions with certain other compounds presently used as plasticizers.

| Compound | cc. N-alkali soln./100 gms. of material |
|---|---|
| 2,4,6-trimethylcyclohexyl carbinyl 3-sulfolanyl ether | 0.077 |
| Dibutyl phthalate | 0.25 |
| Polyallyl butyrate | 1.10 |
| Methyl phthallyl ethyl glycolate | 106.2 |

*Example XV*

A compression molded plasticized cellulose acetate resin was prepared by compounding a low viscosity cellulose acetate resin containing about 53% acetyl, with 30% by weight of 2,4,6-trimethylcyclohexyl carbinyl 3-sulfolanyl ether and subjecting the resulting compounded mixture to compression molding. For comparative purposes four additional samples of compression molded plasticized cellulose acetate resin were prepared under identical conditions but utilizing in each, one of the plasticizers indicated in the following table in place of the 2,4,6-trimethylcyclohexylcarbinyl 3-sulfolanyl ether.

The samples were then tested under identical conditions to determine the ASTM flow temperature, rate of water absorption, and volatility. The flow temperature was determined in accordance with the ASTM Method No. D-569-43. The rate of water absorption was determined by difference in water content of each sample between zero and 100% relative humidity at 25° C. The results are indicated in the table in percent of water absorbed in weight percent. The volatility was determined by noting the loss in weight over a period of 96 hours at a temperature of 100° C. The loss in weight of the resin plasticized with 2,4,6-trimethylcyclohexyl carbinyl 3-sulfolanyl ether was by far the lowest. Utilizing this value as unity, the loss of weight by the other samples is indicated in the table as a multiple thereof.

| Plasticizer | ASTM Flow Temp, °C. | Water Absorption, Per Cent | Volatility |
| --- | --- | --- | --- |
| 2,4,6-trimethylcyclohexyl carbinyl 3-sulfolanyl ether | 147 | 3.9 | 1 |
| Polyallyl acetate | 157 | 4.7 | 4.3 |
| Diethyl phthalate | 148 | 5.3 | 2 |
| Methyl phthallyl ethyl glycolate | 146 | 5.3 | 2 |

*Example XVI*

Cast films were prepared from a high viscosity, cellulose acetate resin (containing about 59% acetyl), plasticized with 40 parts by weight of 3,3,5-trimethylcyclohexyl 3-sulfolanyl ether per 100 parts by weight of resin. A second set of films was cast under identical conditions with the exception than n-decyl 3-sulfolanyl ether was employed as the plasticizer. Both sets of films were optically clear and in neither did the plasticizer sweat out under molding conditions. Flow properties of the cast resins were judged by examination of a sample of the cast resin extruded in the Tinius Olsen Flow Tester. In this test the film is folded, packed into a pill; the pill is extruded at 360° F. (120 p. s. i. steam pressure) at about ½ to 1 ton pressure/sq. in. Results obtained indicated that the cellulose acetate resin plasticized with 3,3,5-trimethylcyclohexyl 3-sulfolanyl ether can be molded into a clear specimen, which, upon severe folding, breaks without revealing the interfaces of the original film surface, testifying to excellent flow properties given the resin by the plasticizer of the invention. The resins plasticized with the n-decyl 3-sulfolanyl ether, the tests indicated, though capable of being molded into a clear specimen, upon folding delaminate at the interfaces of the original film surface, indicating poor knitting of the film during molding.

*Example XVII*

A set of films was cast from molding grade, low viscosity cellulose acetate (containing about 53% acetyl) plasticized with 25, 50, 75 and 100 parts by weight of 2,4,6-trimethylcyclohexyl carbinyl 3-sulfolanyl ether per 100 parts by weight of resin. A comparative set of films was prepared under identical conditions for each of the plasticizers listed in the following table. The films were examined under identical conditions to determine their optical clarity and evidence of sweating out of plasticizer.

In the following table, the values indicated in column A list the maximum amount of plasticizer tolerated by the resin to yield an optically clear film. Numerical values in column B indicate the maximum plasticizer content tolerated without sweating out of plasticizer.

| Plasticizer | Parts plasticizer per 100 parts of Cellulose Acetate | |
| --- | --- | --- |
| | A clear film | B No sweat |
| 2,4,6-trimethylcyclohexyl carbinyl 3-sulfolanyl ether | 100 | 100 |
| N-decyl-3-sulfolanyl ether | 100 | 75 |
| Diethyl phthalate | 50 | 75 |
| Dibutyl phthalate | 25 | 25 |

*Example XVIII*

A molding powder was prepared by wetting 100 grams of low viscosity cellulose acetate (containing about 53% acetyl) mixed with 45 grams of plasticizer with about 100 cc. ethyl alcohol and then dissolving the mixture in 600–700 cc. acetone. This solution was poured in a Pyrex dish and the solvent evaporated at room temperature. When dry the thick film was ground and the ASTM flow temperature determined (ASTM D-569-43). A portion of the molding powder was molded into a 2 gram disc. The disc was tested for brittleness and color after exposure to a temperature of 100° C. for 96 hours. The disc was considered brittle if it could not be bent at 90° C. A similar molding powder was prepared utilizing N-decyl-3-sulfolanyl ether as the plasticizer under otherwise identical conditions. The results obtained are indicated in the following table:

| Plasticizer | Wt. per cent plasticizer in Molding Pdr. (dry basis) | ASTM Flow, Temp., °C. | Color | Brittleness |
| --- | --- | --- | --- | --- |
| 2,4,6-trimethylcyclohexyl carbinyl 3-sulfolanyl ether | 28.2 | 143 | optically clear | not brittle. |
| N-decyl-3-sulfolanyl ether | 27.5 | 157 | Yellow | brittle. |

This application is a continuation-in-part of copending application Serial Number 512,050, filed November 27, 1943, now Patent No. 2,435,404.

We claim as our invention:

1. 3,3,5-trimethylcyclohexyl 3-sulfolanyl ether.
2. 3,3,5 - trimethylcyclohexylcarbinyl 3-sulfolanyl ether.
3. 2,4,6-trimethylcyclohexylcarbinyl 3 - sulfolanyl ether.
4. The compounds of the general formula

wherein X is a member of the group consisting of polymethyl-substituted cyclohexylcarbinyl and polymethyl-substituted cyclohexyl and Y is a sulfolanyl radical.

5. The compounds of the general formula

wherein X is a member of the group consisting of polymethyl-substituted cyclohexylcarbinyl and polymethyl-substituted cyclohexyl and Y is a sulfolenyl radical.

6. The compounds of the general formula

X—O—Y wherein X is a member of the group consisting of polyalkyl-substituted cyclohexylcarbinyl and polyalkyl-substituted cyclohexyl and Y is a sulfolanyl radical.

7. The compounds of the general formula

X—O—Y wherein X is polyalkyl-substituted cyclohexyl and Y is a radical of the group consisting of a sulfolanyl radical and a sulfolenyl radical.

8. The compounds of the general formula

X—O—Y wherein X is polyalkyl-substituted cyclohexyl and Y is a radical of the group consisting of a sulfolanyl radical and a sulfolenyl radical.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,291,798 | Delfs | Aug. 4, 1942 |
| 2,357,344 | Morris et al. | Sept. 5, 1944 |
| 2,360,860 | Morris et al. | Oct. 24, 1944 |

---

Certificate of Correction

Patent No. 2,504,099                                                 April 18, 1950

RUPERT C. MORRIS ET AL.

It is hereby certified that error appears in the printed specification of the above numbered patent requiring correction as follows:

Column 16, line 1, after "is" insert the words *a member of the group consisting of polyalkyl-substituted cyclohexylcarbinyl and*;

and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.*